US005293548A

United States Patent [19]

Siebert

[11] Patent Number: 5,293,548

[45] Date of Patent: Mar. 8, 1994

[54] DISPERSIVE RUGATE COATINGS

[75] Inventor: Edward T. Siebert, New Fairfield, Conn.

[73] Assignee: Hughes Aircraft Company, Los Angeles, Calif.

[21] Appl. No.: 857,007

[22] Filed: Mar. 25, 1992

[51] Int. Cl.[5] ........ G02B 5/28

[52] U.S. Cl. ........ 359/580; 359/586; 359/589; 359/615

[58] Field of Search ........ 359/580, 582, 586, 589, 359/615

[56] References Cited

U.S. PATENT DOCUMENTS

| | | | |
|---|---|---|---|
| 4,170,416 | 10/1979 | Fencil | 356/346 |
| 4,536,089 | 8/1985 | Siebert | 356/352 |
| 4,583,822 | 4/1986 | Southwell . | |
| 4,666,250 | 5/1987 | Southwell | 359/586 |
| 4,826,267 | 5/1989 | Hall et al. | 359/586 |
| 4,952,025 | 8/1990 | Gunning, III . | |
| 4,958,892 | 9/1990 | Jannson et al. | 359/580 |
| 5,009,485 | 4/1991 | Hall | 359/586 |
| 5,056,099 | 10/1991 | Bradley | 359/580 |

*Primary Examiner*—Martin Herner
*Attorney, Agent, or Firm*—Michael W. Sales; Wanda K. Denson-Low

[57] ABSTRACT

An optical element (10) is provided with a coating so as to selectively pass spectral lines of interest. The element includes a substrate (14) having a first major surface and a second, opposite major surface. The element further includes a coating, preferably a rugate coating (12), formed upon at least one of the major surfaces. The rugate coating has a spatially varying index of refraction profile through a depth thereof. The profile is selected so as to provide the element with a prescribed dispersion characteristic that matches a dispersion characteristic of a source of the radiation signal.

8 Claims, 5 Drawing Sheets

RUGATE FOR BAND OF WAVELEGTHS $$n(x) = n_o\,[1 + \int H(n_i K(x - x_o)/n_o u(K)\sin(Kx + \phi(K))\,dK/K],$$

$$\approx n(x) = n_o + n_1(\Delta K/\overline{K})\sin(Kx + \phi)\,\mathrm{sinc}\,[(x + \phi')\Delta K/2)]$$

FOR SMALL DISPERSION

RUGATES FOR SPECTRAL BANDS

RUGATE FOR SINGLE WAVELENGTH $M = MO + M1 \sin(KX + \phi)$

RUGATE FOR BAND OF WAVELEGTHS $$n(x) = n_o \left[1 + \int H(n_i K(x - x_o) / n_o u(K) \sin(Kx + \phi(K)) \, dK/K\right],$$

$$\approx n(x) = n_o + n_1(\Delta K/\overline{K}) \sin (Kx + \phi) \operatorname{sinc} [(x + \phi')\Delta K/2)]$$

FOR SMALL DISPERSION

RUGATE TRUNCATED AT NULLS OF ENVELOPE

DISPERSIVE RUGATE COATINGS

CROSS REFERENCE TO RELATED PATENT APPLICATIONS

This patent application is related to commonly assigned U.S. patent application Ser. No. 07/857,345, filed Mar. 25, 1992, entitled "Improved Coatings for Laser Detector Etalons". by E. T. Siebert and S. J. Kishner and to commonly assigned U.S. patent application Ser. No. 07/857,367, filed Mar. 25, 1992, entitled "Etalons with Dispersive Coatings", by E.T. Siebert.

1. Field of the Invention

This invention relates generally to optical devices and, in particular, to coating materials and methods for optical devices.

2. Background of the Invention

The use of narrowband Fabry Perot etalons for spectral analysis is known in the art, as evidenced by those described by R. Russel Austin in "Solid Fabry-Perot Etalons as Narrow Band Filters" (Electro Optical System Design, 6, 32, July 1973, pp. 32–37), Adrian E. Roche and Alan M. Title in "Ultra Narrow Band Infrared Filter Radiometry", Second Joint Conference on Sensing Atmospheric Pollutants, -ISA-JSP 6656, Washington D.C., December 10–12, 1973, pp. 21–24. Narrowband etalons are used in such applications as Fraunhofer Line Discriminators, as described in "The Fraunhofer Line Discriminator MK II" by James A. Plascyk and Fred C. Gabriel (IEEE Transactions on Instrumentation and Measurement, Vol. IM-24, No. 4, December 1975, pp. 306–313), and in the Hydrogen Alpha Telescope launched by NASA.

As employed herein, the term "etalon" is intended to encompass an optical device or element having two partially reflecting surfaces that are parallel to each other to optical tolerances. The space between the two reflecting coatings can be air or an optical material, and can be thick or thin. The thicker the spacer, the higher the resolution of the etalon. FIG. 1*a* shows a "solid" etalon where the spacer is a thick optical material 2. When the spacer is solid and thin, the etalon assumes the form of an interference filter.

Most prior art Fabry Perot etalons filter out only a single, narrowband line. However, since the etalon exhibits a periodic channel spectrum the periodicity of channel spectra can be matched to nearly periodic spectra over a narrow spectral region. When the source spectra is notably aperiodic, the etalon can be matched to only two lines. Furthermore, if the source lines are widely separated, degradations in the etalon finesse typically allow the etalon to be used for only one line. One common example concerns the Fraunhofer lines in the atmosphere. These lines are not only aperiodic, but are also widely spaced apart. Therefore, three separate etalons were required to be used in the Fraunhofer Line Discriminator referred to above.

The use of low finesse etalons for analyzers and/or detectors of coherent radiation is also known in the art. As an example, U.S. Pat. No. 4,536,089, entitled "Analyzer for Coherent Radiation", (Aug. 20, 1985) to E. T. Siebert, shows in FIG. 4, a multi-stepped etalon for use with a plurality of radiation detectors coupled to a plurality of detector channels. Reference is also made, by example, to U.S. Pat. No. 4,170,416, entitled "Apparatus for Analyzing Coherent Radiation", (Oct. 9, 1979) to C. R. Fencil. This patent shows a Fabry-Perot interferometer or etalon that comprises a flat glass spacer having partially reflecting, stepped surfaces. The disclosure of each of these two U.S. Patents is incorporated by reference herein in their entireties.

The use of high finesse etalons as spectral filters is also known in the art. FIG. 1*a* illustrates a multi-line etalon 1 comprised of a substrate 2 and coatings 3 and 4. The transmission characteristics of the etalon 1 are designed to be nominally matched to atmospheric or laser spectral lines. FIG. 1*b* illustrates the periodic spectral lines passed by the etalon 1 (transmission peaks) and also illustrates typical aperiodic atmospheric spectral lines. The prior art etalon la does not exhibit dispersion ($\phi=0$) and, as a result, the etalon "walks off" of the atmospheric spectral lines, which are affected by molecular dispersion. This results in a failure of the etalon 1 to pass the atmospheric lines of interest and a resulting failure to detect the presence of these lines.

The etalon "finesse" is a measure of etalon quality and may be expressed as a ratio of line spacing to line width. In other words, the etalon finesse is a function of etalon reflectivity so that as reflectivity increases, so does the finesse.

Chromatic dispersion has long been a cause of degradation in refractive optical systems. In achromatic lenses, chromatic dispersion is cancelled at several specific wavelengths, but is non-zero elsewhere. No conventional technique is known to the inventor for cancelling dispersion across the spectral band.

It is thus one object of the invention to provide improved coatings for optical elements, such as etalons, that provide a controlled and prescribed dispersion characteristic thereto.

It is another object of the invention to provide a coating with a prescribed dispersion that compensates for dispersion in refractive optical systems.

SUMMARY OF THE INVENTION

The foregoing and other problems are overcome and the object of the invention is realized by embodiments of optical elements having a prescribed dispersion. That is, the invention provides optical elements that generate a phase shift for light that varies with wavelengths of the light. Specifically, there is described an embodiment of a multi-line etalon having a prescribed dispersion that matches, by example, a molecular dispersion of a species to be detected. That is, the etalon transmission peaks match those of the species so as to prevent "walk off". Beneficially, the etalon is enabled to pass more lines than etalons of the prior art, or narrower bandwidth filters may be provided. There are also described etalon filters that simultaneously pass a number of unrelated lines, such as, by example, the Fraunhofer lines in the sun. There is also described an optical element, for use in an interferometer, having a prescribed dispersion to control fringe shifts as a function of wavelength.

Chromatic aberration in optical systems can be eliminated by adding a dispersive coating to the system, the coating being designed to compensate for the known chromatic aberrations. This provides improved performance and reduces a number of elements required to correct for chromatic aberration.

In addition, the invention teaches two methods of designing the dispersion coatings. A first method employs a rugate coating technology in which the phase of the rugate is controlled to provide the desired result. A second method employs an iterative coating technique in which a coating having the desired properties is generated by successive approximations, using a nominal starting point and coating optimization procedures.

The invention extends the use of a rugate coating to provide a controlled and prescribed dispersion characteristic for an optical element, such as an etalon. An important factor in designing such a dispersive rugate coating is shown to be a realization that, in a rugate, the phase shift on reflection is directly related to the phase of a sinusoidal index of refraction profile within the rugate coating, while the frequency of the sinusoidal index of refraction profile determines the wavelength at which the phase shift occurs. Thus, by changing the phase of the sinusoidal index of refraction variation as the period of the sinusoidal index of refraction variation is changed, a phase shift of incident radiation is produced that is a function of the wavelength of the incident radiation.

BRIEF DESCRIPTION OF THE DRAWINGS

The above set forth and other features of the invention are made more apparent in the ensuing Detailed Description of the Invention when read in conjunction with the attached Drawing, wherein.

DETAILED DESCRIPTION OF THE INVENTION

Reference is made to an article entitled "Spectral Response Calculations of Rugate Filters Using Coupled-wave Theory", by W. H. Southwell, Journal of the Optical Society of America, Vol. 5(9), 1558-1564(1988). This article discusses gradient-index interference filter coatings having an index of refraction that varies in a continuous fashion in a direction normal to a substrate. A narrow bandwidth ref lector is shown to be achieved with a rugate coating, the bandwidth being inversely proportional to rugate thickness.

Figure 3:
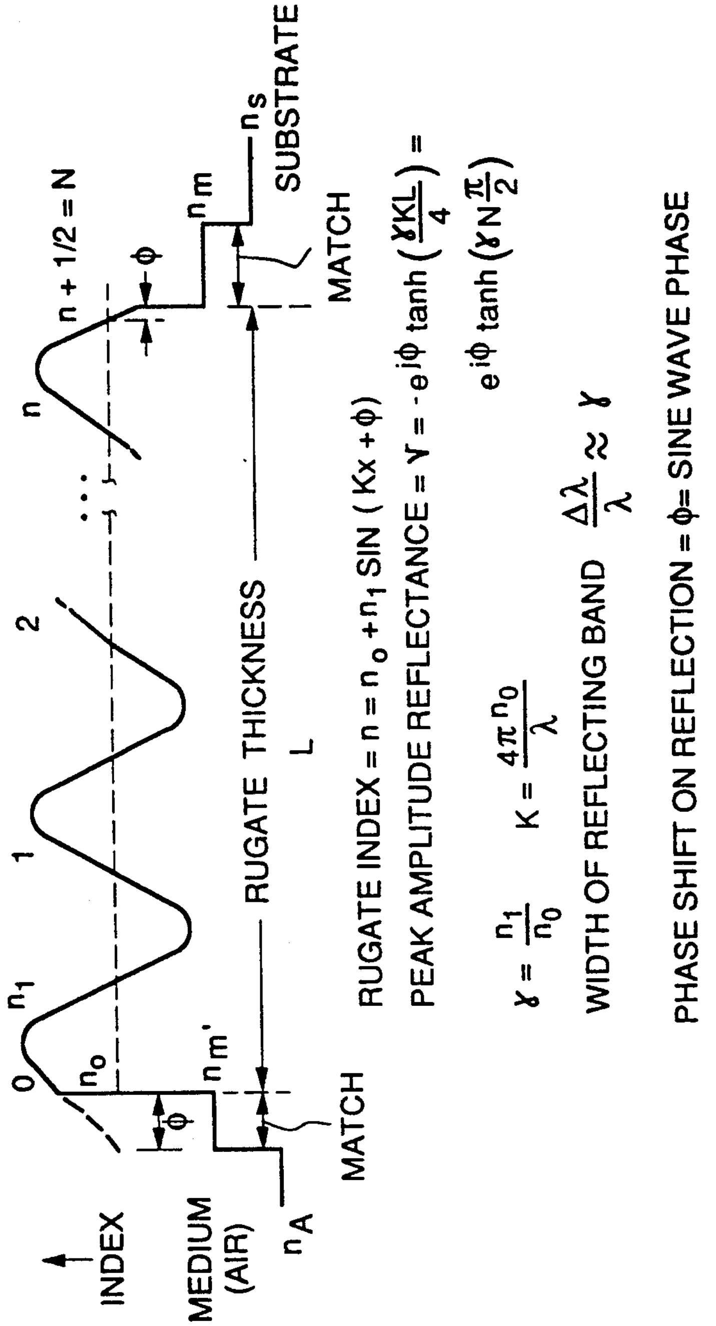
FIG. 3 is a graph illustrating an index of refraction profile for a rugate as a function of thickness.

In FIG. 3 there is shown an exemplary rugate index of refraction profile. In FIG. 3, the substrate is on the right, light is incident from the left, $n_s$ is the index of refraction of the substrate, $n_A$ is the index of refraction of the incident medium, typically air, $n_o$ is the average index of refraction through the rugate, and $n_1$ is the peak index of refraction variation, which is typically small compared with $n_o$. Phi ($\phi$) is the starting or initial phase of the index of refraction variation.

The word rugate, when used as a noun, is herein intended to define a gradient-index interference filter whose index of refraction profile is a sine wave. When used as an adjective, the word rugate is herein taken to describe the sine-wave index of refraction profile of a coating.

The invention extends the use of a rugate coating to provide a change in phase with wavelength. That is, the phase is made dispersive. An important factor in designing such a dispersive rugate coating is a realization that in a rugate the phase shift on reflection is directly related to the phase of a sinusoidal index of refraction profile within the rugate coating, while the frequency of the sinusoidal index of refraction profile determines the wavelength at which the phase shift occurs. Thus, by changing the phase of the sinusoidal index of refraction variation as the period of the sinusoidal index of refraction variation is changed, a phase shift of incident radiation is produced that is a function of the wavelength of the incident radiation.

Figure 4A:
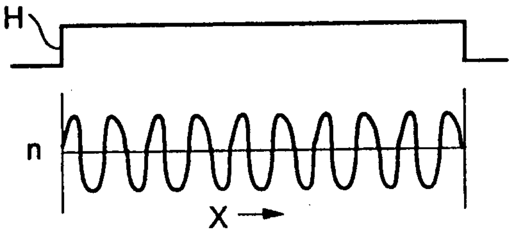
FIG. 4*a* illustrates a rugate for use with a single wavelength.

For a single wavelength a rugate has an index of refraction (index) profile of:

$$n=n_o+n_1 \sin (Kx+\phi),\ K=4\pi n_o/\lambda \tag{1}$$

where $n_o$ is an average index, $n_1$ is a peak index variation, K determines a wavelength $\lambda$ for which maximum reflection occurs, $\phi$ is a starting phase of the index variation, and x is a thickness within a range of $(0 \leqq x \leqq L)$. The amplitude reflectance (r) produced by this profile is:

$$r = \tanh (u/4) \exp (i\phi),\quad u = KLn_1/n_0 = 2\pi Nn_1/n_0, \text{ where } |r|^2 = R = \text{intensity reflectivity}, \tag{2}$$

and where $\Delta\lambda/\lambda = n_1/n_0$ is a fractional bandwidth, where N is a number of cycles in the coating, normally half integer, and L is the physical thickness of the coating. It can be seen that the maximum reflectivity is determined by the product of the fractional index variation times the number of cycles, while the phase shift on reflection is given by the phase shift of the index profile, $\phi$. The foregoing analysis provides a basis for a rugate design for use with a single wavelength, as depicted in FIG. 4*a*.

Figure 4B:
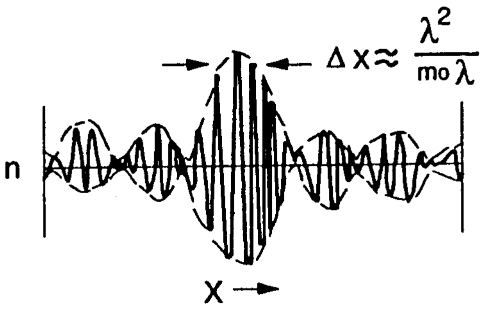
FIG. 4*b* illustrates a rugate for use with a band of wavelengths.

For multiple wavelengths which are widely separated $(\lambda_i-\lambda_j>>\Delta\lambda)$, a rugate may be obtained for each wavelength by summing the index profiles:

$$n(x)=n_o+\Sigma n_i \sin (Kix+\phi i)H((n_iKx')/(n_oui)) \tag{3}$$

as is shown in FIG. 4*b*. That is, the individual rugate sine waves are added together so as to produce a complex waveform shape that describes the required index of refraction variation within the coating. H is an envelop function that defines the extent of the coating, and $(x-x_o)=x'$, wherein $x_o$ gives the location of envelop H. As shown in FIG. 4*a*, H is a square aperture so that $H(t)=1$ if $0<t<1$ and zero otherwise $(t=x'/L)$. More generally, H can be any function of finite extent. In particular, it is usually desirable to select H so as to minimize sidelobes around the reflection band. This is called apedization. L has been expressed in terms of (u) so that it is related to reflectivity through Equation 2.

To design a rugate over a continuous wavelength band, the sum of Eq. (3) is replaced by an integral:

$$n(x)=n_o[1+\int H(n_iK(x-x_o)/n_ou(K))\sin(Kx+\phi(K))dK/K] \tag{4}$$

where $n_o$ is equal to the average index of refraction, $K=4\pi n_o/\lambda$, $\phi'$ is the internal angle in the coating and $\lambda$ is the wavelength, where $u(K)=4\tanh^{-1}[R(K)]^{\frac{1}{2}}$ is a number of cycles in the coating to achieve a desired reflectivity R(K), $n_1$ is the peak deviation of the index from $n_o$ for a single wavelength, where $\phi(K)$ is the phase of reflected light as a function of K, where x is a distance into the coating, and where H is an envelope or apedizing function located at $x_o$ whose extent defines the region of index variation at the wavelength $\lambda$.

Above, the term $dK/\Delta K=dK\ n_o/n_iK$ is used to go from a sum to an integral.

Figure 4C:
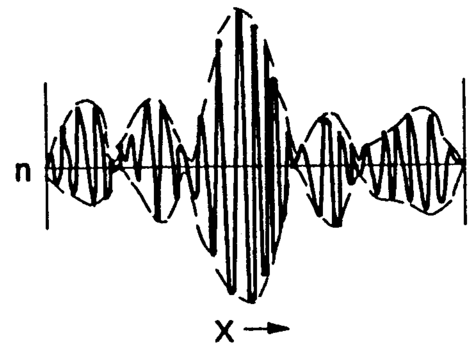
FIG. 4*c* illustrates a rugate truncated at nulls of an envelope.

When $n_1$ is constant and $\phi$ is constant or linear in K (that is, same reflectivity at all wavelengths and no dispersion), and $\Delta K$ is small, the integral gives:

$$n(x)=n_o+n_1(\Delta\overline{K}/K)\sin(\overline{K}x'+\overline{\phi})\text{sinc}[(x+\phi')\Delta K/2], \quad (5)$$

where $\phi'$ is the derivative of $\phi$ with respect to K (assumed to be constant or zero), and $\overline{K}$, $\phi$ are the average values of K, $\phi$. This is similar to the aforedescribed case for a single wavelength, except that the sine wave is multiplied by an additional envelope (the sinc function) which limits the envelope extent to $\Delta x\approx 2\pi/\Delta K=(\pi)^2/2(n_o)\Delta\lambda$. As the spectral bandwidth increases, the region wherein the index varies significantly becomes smaller. It is possible to truncate this envelope, which is technically larger than L, as seen in FIG. 4c. The rugate parameters are chosen such that the phase shift over $\Delta\lambda$ is small.

Even when $\phi$ is slightly dispersive, Eq. (5) remains approximately valid with $\phi$ replaced by $\phi(K)$, so that the same conclusions hold.

Based on the foregoing, there will first be described a technique for specifying a spatially uniform dispersive coating. Next there will be described a technique for specifying spatially non-uniform coatings.

A technique for specifying a dispersive rugate coating over an extended spectral region is now provided. Using the desired dispersion and reflectivities for a given application Eq. (4) is used to determine a nominal coating design. The envelope may be truncated (usually at a zero of the sinc function) or apedized to limit it to a finite region. Truncation is limited by the fractional bandwidth required, which is chosen so that the phase shift change is small in $\Delta\lambda$. The design may be iterated, if necessary, to eliminate truncation and end matching effects. It is also within the scope of the invention to convert the resulting graded index specification into a discrete multilayer embodiment, using standard techniques.

Figure 1B:
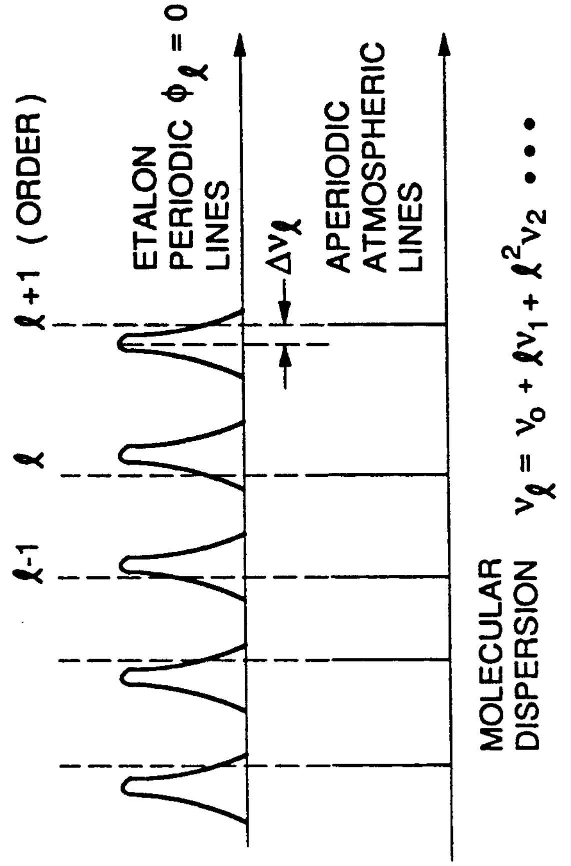
FIG. 1*b* illustrates etalon transmission peaks in relation to aperiodic atmospheric spectral lines.
Figure 1A:
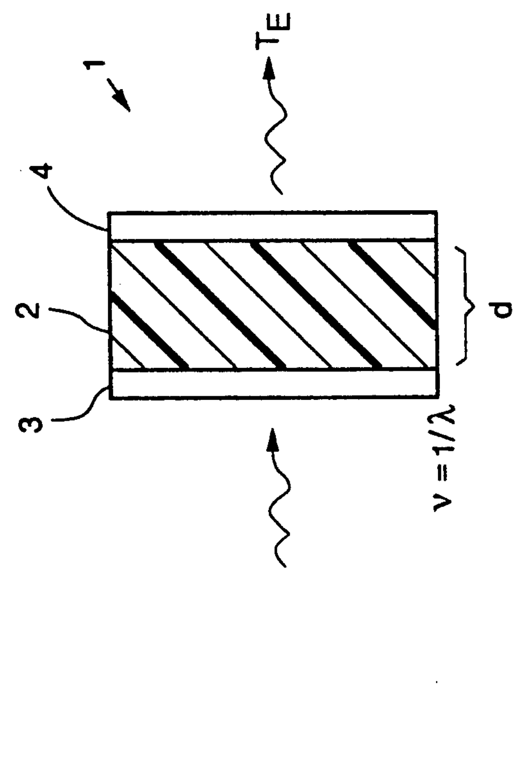
FIG. 1*a* shows an etalon of the prior art.
Figure 2A:
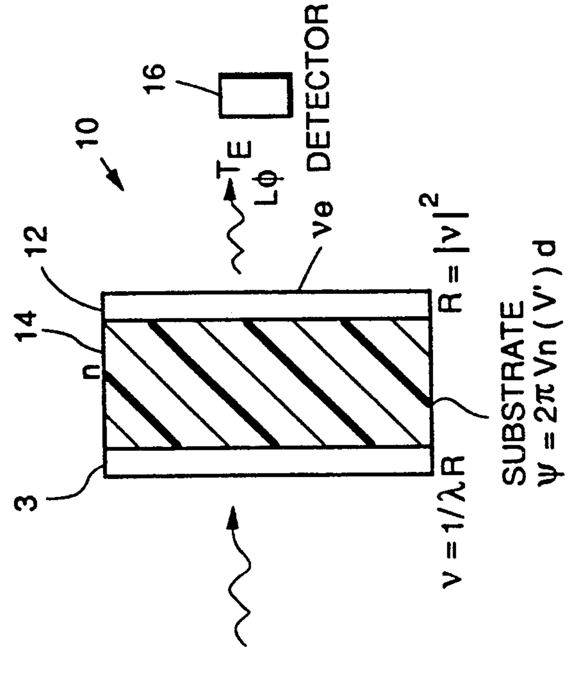
FIG. 2*a* shows an etalon constructed so as to have a prescribed dispersion characteristic.
Figure 2B:
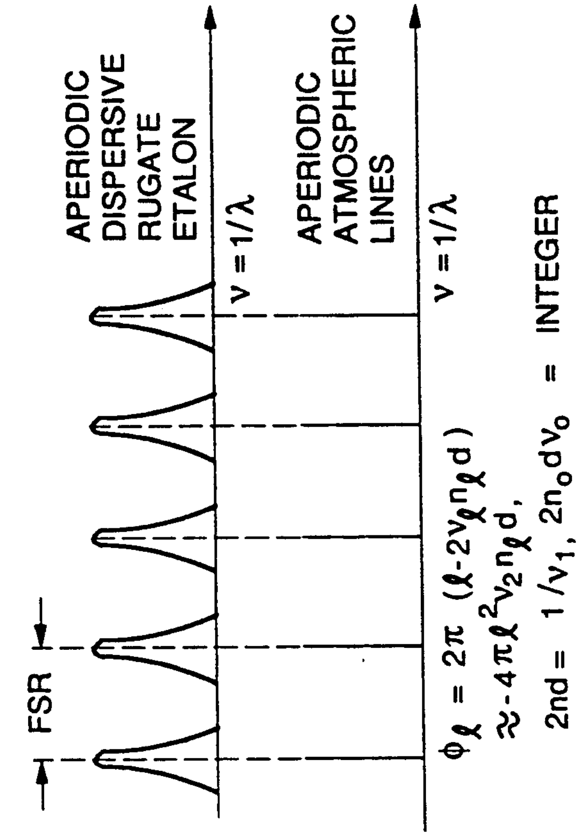
FIG. 2*b* illustrates transmission peaks of the etalon of FIG. 2*a* being matched to aperiodic atmospheric spectral lines.

FIG. 2a shows an etalon 10 constructed so as to have a prescribed dispersion characteristic for a rugate coating 12 applied to a major surface of a substrate 14. Radiation is incident upon the opposite major surface. FIG. 2b illustrates transmission peaks of the etalon of FIG. 2a being matched to aperiodic atmospheric spectral lines. A comparison of FIG. 2b to FIG. 1b shows that the etalon 10 transmission characteristic is matched to the dispersion characteristic of the source of radiation, and that dispersion induced by molecular species in the medium are compensated for.

Fabrication of the etalon 10 is essentially unchanged from standard rugate (or multilayer) fabrication. For rugates, the following points should be noted. First, the coating starting point (at the substrate) may not be at n0. However, truncation at a zero of the sinc function, or apedization, returns the starting point to zero. Second, the average frequency is essentially unchanged from the midband. Third, because a significant blocking region is generally desired around the etalon line, the rugate reflection band is relatively wide. This indicates that the rugate coating should be relatively thin, in that the bandwidth of the rugate decreases as the rugate thickness is increased for constant n. A relatively thin rugate coating relaxes fabrication control requirements and decreases stress build-up in the coating. Thus, standard coating fabrication techniques are applicable.

In FIG. 2a the substrate 14 may be comprised of glass, and the coating 12 material may be comprised of, by example, $ThF_4$, ZnSe, $Si_xO_y$, and $TiO_2$, and of combinations thereof. A presently preferred method of coating deposition employs an evaporative technique wherein the substrate 14 is placed in an evacuated chamber with the selected coating source materials, and where the source materials are controllably evaporated and deposited upon a surface of the substrate 14 so as to provide the graded index of refraction variation with depth, or a multi-layered approximation thereof.

Figure 5:
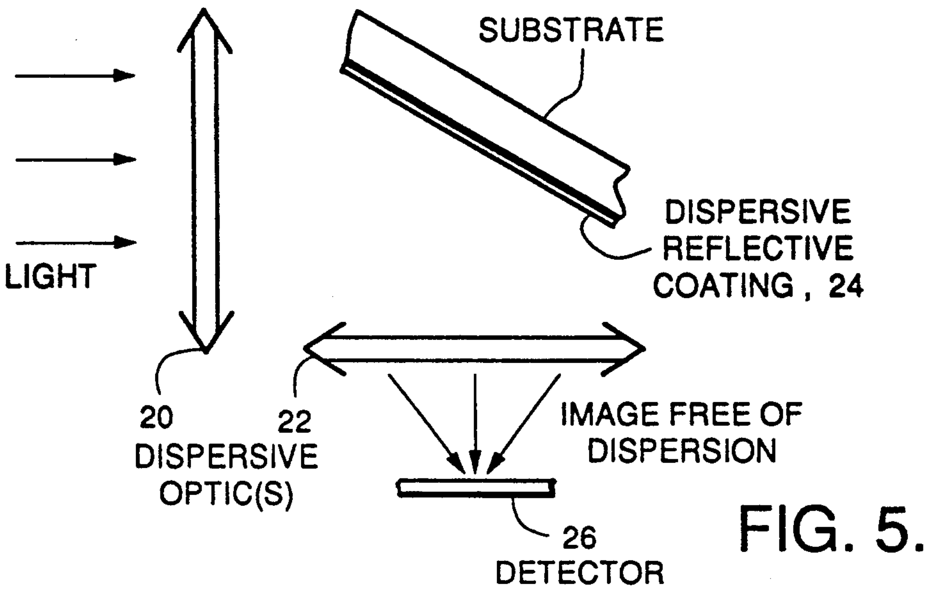
FIG. 5 illustrates a dispersive coating combined with one or more groups of dispersive optics to produce a dispersionless system.

To correct for dispersion and/or chromatic aberration in optical systems, or to add a prescribed dispersion, one can add a coating to the optical system that has the desired dispersion characteristic. This can be done to correct for chromatic aberrations in refractive optics, dispersion effects in spectrometers, chromatic aberrations in binary optics, etc. An example of such a corrector for a refractive optical system containing one or more groups of optics, with one or more of the optic groups being dispersive, is shown in FIG. 5. Here two groups of dispersive optics 20 and 22 are shown with a dispersive reflective coating 24 between them, the coating 24 being nominally located at the pupil. The dispersive reflective coating 24 is designed, as described in detail above, to compensate for the dispersion in the optics 20 and/or 22, and to provide an image free of dispersion at, by example, a radiation receiving surface of a detector 26.

In optical systems, the dispersion usually varies spatially, as in chromatic focal changes, chromatic spherical aberration, etc.. This requires a coating whose dispersion varies spatially across the aperture. This coating can be provided by the use of conventional coating systems.

In a first coating system method, applicable only when the spatial variation in dispersion is not too large, the coating chamber geometry and parameters are varied to produce a non-uniform coating having the desired characteristics. However, this is frequently difficult to accomplish in practice.

In a second coating system method, a spatial mask is inserted in the coating path for a period of time chosen so that the coating has the correct distribution. The dwell time for any spatial region is chosen to obtain the desired coating deposition for that region. This technique can be used to change the starting phase of the coating, but becomes complicated for controlling dispersion.

Figure 6A:
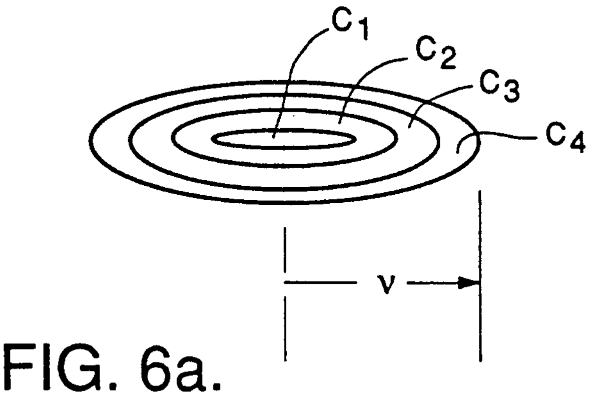
FIGS. 6*a* and 6*b* illustrate a combination of multiple coatings to produce any spatial dispersion profile.
Figure 6B:
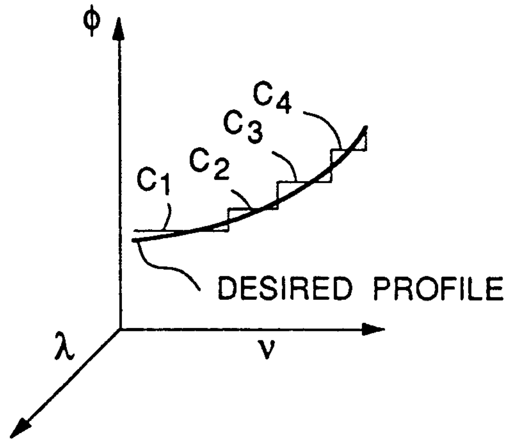

In a third coating system method, illustrated in FIG. 6a, several coatings are deposited over different spatial regions of the substrate. Given any arbitrary, spatially varying dispersive profile, $\phi(\lambda,\bar{r})$, one determines a series of spatial regions, $c_i$, so that $\phi(\lambda,\bar{r})$ differs only slightly from $\phi_i(\lambda)$ over that region, as depicted in FIG. 6b. This technique provides a piecewise approximation to $\phi(\lambda, r)$. Over each region, $c_i$, a coating is applied with dispersion $\phi_i(\lambda)$. While each coating is nominally spatially uniform over its region, it can be tapered slightly (by the above methods) to reduce the discontinuities between adjacent regions.

By example, etalons constructed in accordance with the invention may be employed, also by example, as components of Fraunhofer line discriminators and as narrow band filters matched to molecular species, of a type referred to in the journal articles described above, to improve the detection characteristics thereof.

The optical elements of the invention may also be employed as filters that simultaneously pass a number of unrelated lines, such as, by example, the Fraunhofer lines in the sun. The optical elements may also be employed in an interferometer, wherein the optical element or elements have a prescribed dispersion to control wavelength-dependent fringe shifts.

In general, an optical device constructed in accordance with the invention is provided with a prescribed dispersion characteristic that is related to a dispersion characteristic of a source of radiation and/or a medium through which the radiation passes and/or a desired induced dispersion.

Thus, while the invention has been particularly shown and described with respect to a preferred embodiment thereof, it will be understood by those skilled in the art that changes in form and details may be made therein without departing from the scope and spirit of the invention.

What is claimed is:

1. A method of fabricating an optical element so as to provide a prescribed dispersion characteristic for wavelengths of interest thereto, comprising the steps of:

providing a substrate; and forming a coating upon a surface of the substrate, the step of forming including a step of, varying a phase of a sinusoidal index of refraction variation within the coating while varying a period of the sinusoidal index of refraction variation so as to provide a phase shift for incident radiation that is a function of the wavelengths of interest wherein said coating includes a rugate coating having a spatially varying index of refraction profile n(x) that varies in accordance with a sinusoidal function, wherein n(x) is given by the expression:

$$n(x)=n_o[1+\int H(n_iK(x-x_o)/n_ou(K))\sin(Kx+\phi(K))dK/K]$$

where $n_o$ is equal to the average index of refraction, $K=4\pi n_o/\lambda$, $\phi'$is the internal angle in the coating and $\lambda$ is the wavelength, where $u(K)=4\tanh^{-1}[R(K)]^{\frac{1}{2}}$is a number of cycles in the coating to achieve a desired reflectivity R(K), $n_1$ is the peak deviation of the index from $n_o$ for a single wavelength, where $\phi(K)$ is the phase of the reflected light as a function of K, where x is a distance into the coating, and where H is an envelope or apodizing function located at $x_o$ whose extent defines the region of index variation at the wavelength $\lambda$.

2. The method of claim 1 wherein said profile represents the sum of a plurality of sinusoidal patterns, each pattern having a wavelength and phase corresponding to a desired phase shift at a wavelength of interest.

3. An optical device for selectively transmitting or reflecting radiation having spectral lines of interest, comprising:

a substrate having a surface; and a coating formed upon said surface of said substrate, said coating having a spatially varying index of refraction profile through a depth thereof, the profile being selected so as to provide said optical device with a prescribed phase shift at the spectral lines of interest wherein said coating includes a rugate coating having a spatially varying index of refraction profile n(x) that varies in accordance with a sinusoidal function, wherein n(x) is given by the expression:

$$n(x)=n_o[1+\int H(n_iK(x-x_o)/n_ou(K))\sin(Kx+\phi(K))dK/K]$$

where $n_o$ is equal to the average index of refraction, $K=4\pi n_o/\lambda$,$\theta'$is the internal angle in the coating and $\lambda$ is the wavelength, where $u(K)=4\tanh^{-1}[R(K)]^{\frac{1}{2}}$ is a number of cycles in the coating to achieve a desired reflectivity R(K), $n_1$ is the peak deviation of the index from $n_o$ for a single wavelength, where $\phi(K)$ is the phase of the reflected light as a function of K, where x is a distance into the coating, and where H is an envelope or apodizing function located at $x_o$ whose extent defines the region of index variation at the wavelength $\lambda$.

4. The device of claim 3 wherein said profile represents the sum of a plurality of sinusoidal patterns, each pattern having a wavelength and phase corresponding to a desired phase shift at a wavelength of interest.

5. An optical device for selectively passing a wavelength or wavelengths of interest; comprising:

a substrate having a first major surface and a second, opposite major surface; and a coating formed upon at least one of said major surfaces of said substrate, said coating having a spatially varying index or refraction profile through a depth thereof for providing a phase shift at the wavelength or wavelengths of interest, the profile being selected so as to provide said optical device with a dispersion characteristic that matches a dispersion characteristic of a source of a radiation signal having the wavelength or wavelengths of interest wherein said coating includes a rugate coating having a spatially varying index of refraction profile n(x) that varies in accordance with a sinusoidal function, wherein n(x) is given by the expression:

$$n(x)=n_o[1+\int H(n_iK(x-x_o)/n_ou(K))\sin(Kx+\phi(K))dK/K]$$

wherein $n_o$ is equal to the average index of refraction, $K=4\pi n_o/\lambda$, $\theta'$is the internal angle in the coating and $\lambda$is the wavelength, where $u(K)=4\tanh^{-1}[R(K)]^{\frac{1}{2}}$ is a number of cycles in the coating to achieve a desired reflectivity R(K), $n_1$ is the peak deviation of the index from $n_o$ for a single wavelength, where $\phi(K)$ is the phase of the reflected light as a function of K, where x is a distance into the coating, and where H is an envelope or apodizing function located at $x_o$ whose extend defines the region of index variation at the wavelength $\lambda$.

6. Apparatus for detecting a presence of a source of radiation, comprising:

an optical element disposed for receiving a radiation signal having a wavelength or wavelengths of interest, said optical element including a dispersive coating on at least one surface thereof, said dispersive coating having a spatially varying index of refraction profile through a depth thereof for providing a phase shift at the wavelength or wavelengths of interest, the profile being selected to produce a desired dispersion characteristic and wherein said coating includes a rugate coating having a spatially varying index of refraction profile n(x) that varies in accordance with a sinusoidal function, wherein n(x) is given by the expression:

$$n(x) = n_o[1 + \int H(n_i K(x - x_o)/n_o u(K))\sin(Kx + \phi(K))dK/K]$$

where $n_o$ is equal to the average index of refraction, $K = 4\pi n_o/\lambda$, $\theta'$ is the internal angle in the coating and $\lambda$ is the wavelength, where $u(K) = 4\tanh^{-1}[R(K)]^{\frac{1}{2}}$ is a number of cycles in the coating to achieve a desired reflectivity R(K), $n_1$ is the peak deviation of the index from $n_o$ for a single wavelength, where $\phi(K)$ is the phase of the reflected light as a function of K, where x is a distance into the coating, and where H is an envelope or apodizing function located at $x_o$ whose extent defines the region of index variation at the wavelength $\lambda$.

7. Apparatus as set forth in claim 6 wherein the profile is selected to compensate for a dispersion of the radiation signal due to a molecular species within a medium through which the radiation signal propagates.

8. Apparatus as set forth in claim 6 and further including detector means disposed relative to said optical element for detecting the radiation having the wavelength or wavelengths of interest.

* * * * *